(12) United States Patent
Mentch

(10) Patent No.: US 9,212,503 B1
(45) Date of Patent: Dec. 15, 2015

(54) ADJUSTABLE SHADE GREENHOUSE DEVICE

(71) Applicant: Roger Mentch, Felton, CA (US)

(72) Inventor: Roger Mentch, Felton, CA (US)

( * ) Notice: Subject to any disclaimer, the term of this patent is extended or adjusted under 35 U.S.C. 154(b) by 60 days.

(21) Appl. No.: 14/098,724

(22) Filed: Dec. 6, 2013

(51) Int. Cl.
*E04H 15/36* (2006.01)
*A01G 9/22* (2006.01)
*A01G 9/24* (2006.01)

(52) U.S. Cl.
CPC *E04H 15/36* (2013.01); *A01G 9/22* (2013.01); *A01G 9/242* (2013.01)

(58) Field of Classification Search
CPC ............... E04V 7/16; E04V 1/34; E04V 1/12; A01H 9/00; A01H 9/14; A01H 9/16; A01H 9/22; A01H 9/242; A01H 13/02; A01H 13/0206; E04H 15/54; E04H 15/36; E04H 15/16
USPC ............ 52/63, 81.4, 222; 47/20.1, 22.1, 29.5, 47/29.7, 30, 17; 135/87, 124, 136, 157, 135/115, 117, 119, 120.3, 123; 160/66, 160/248, 84.02, 84.06
See application file for complete search history.

(56) References Cited

U.S. PATENT DOCUMENTS

| | | | | |
|---|---|---|---|---|
| 3,930,344 A | * | 1/1976 | Gahler | 52/2.17 |
| 4,312,157 A | | 1/1982 | Hertel et al. | |
| 4,387,533 A | | 6/1983 | Green et al. | |
| 4,593,710 A | * | 6/1986 | Stafford et al. | 135/136 |
| 4,706,420 A | * | 11/1987 | Winkler | 52/66 |
| 5,035,091 A | | 7/1991 | Ebato | |
| 5,038,517 A | * | 8/1991 | Talbott | 47/17 |
| 5,259,432 A | * | 11/1993 | Danieli | 160/66 |
| 5,802,762 A | | 9/1998 | Stonecypher | |
| 5,813,169 A | * | 9/1998 | Engerman | 47/17 |
| 6,182,737 B1 | * | 2/2001 | Kuwabara | 160/84.06 |
| 6,260,308 B1 | * | 7/2001 | Looney | 52/63 |
| 6,282,834 B1 | * | 9/2001 | Mossey | 47/17 |
| 6,843,019 B2 | | 1/2005 | Mercurio et al. | |
| 2002/0108646 A1 | * | 8/2002 | Hotes | 135/124 |
| 2003/0070353 A1 | * | 4/2003 | Mercurio et al. | 47/17 |
| 2004/0049975 A1 | | 3/2004 | Van Der Heijden | |
| 2007/0051054 A1 | | 3/2007 | Devincenzo et al. | |
| 2010/0126545 A1 | * | 5/2010 | Bullivant et al. | 135/125 |

FOREIGN PATENT DOCUMENTS

| | | |
|---|---|---|
| EP | 0217978 | 4/1987 |
| EP | 0524126 | 1/1993 |
| WO | WO2005027620 | 3/2005 |

* cited by examiner

*Primary Examiner* — Winnie Yip

(57) ABSTRACT

An adjustable shade greenhouse device selectively controls light exposure within a greenhouse. The device includes a frame having spaced cross members arching between lateral sides of the frame. Outermost cross members are positioned at respective ends of the frame. Spacers are each coupled to outermost cross members and spaced longitudinal supports are coupled to and extend between associated pairs of the spacers such that each longitudinal support extends along the frame in inwardly spaced relationship to the cross members. An interior cover is supported by the longitudinal supports. A shade has a lower edge coupled to one of the lateral sides of the frame. A transport bar coupled to the frame is selectively movable along the cross members with a top end of the shade wherein the shade is selectively extendable and retractable over the frame by movement of the transport bar.

13 Claims, 10 Drawing Sheets

ADJUSTABLE SHADE GREENHOUSE DEVICE

BACKGROUND OF THE DISCLOSURE

Field of the Disclosure

The disclosure relates to greenhouse devices and more particularly pertains to a new greenhouse device for selectively extending a shade over a hoop style greenhouse structure to control light exposure within the greenhouse.

SUMMARY OF THE DISCLOSURE

An embodiment of the disclosure meets the needs presented above by generally comprising a frame including a plurality of spaced cross members arching between lateral sides of the frame. Outermost cross members are positioned at respective ends of the frame. Spacers are each coupled to an associated one of the outermost cross members. Each of a plurality of spaced longitudinal supports is coupled to and extends between an associated pair of the spacers such that each longitudinal support extends along the frame in inwardly spaced relationship to the cross members. An interior cover is supported by the longitudinal supports. A shade has a lower edge coupled to one of the lateral sides of the frame. A transport bar coupled to the frame is selectively movable along the cross members with a top end of the shade wherein the shade is selectively extendable and retractable over the frame by movement of the transport bar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
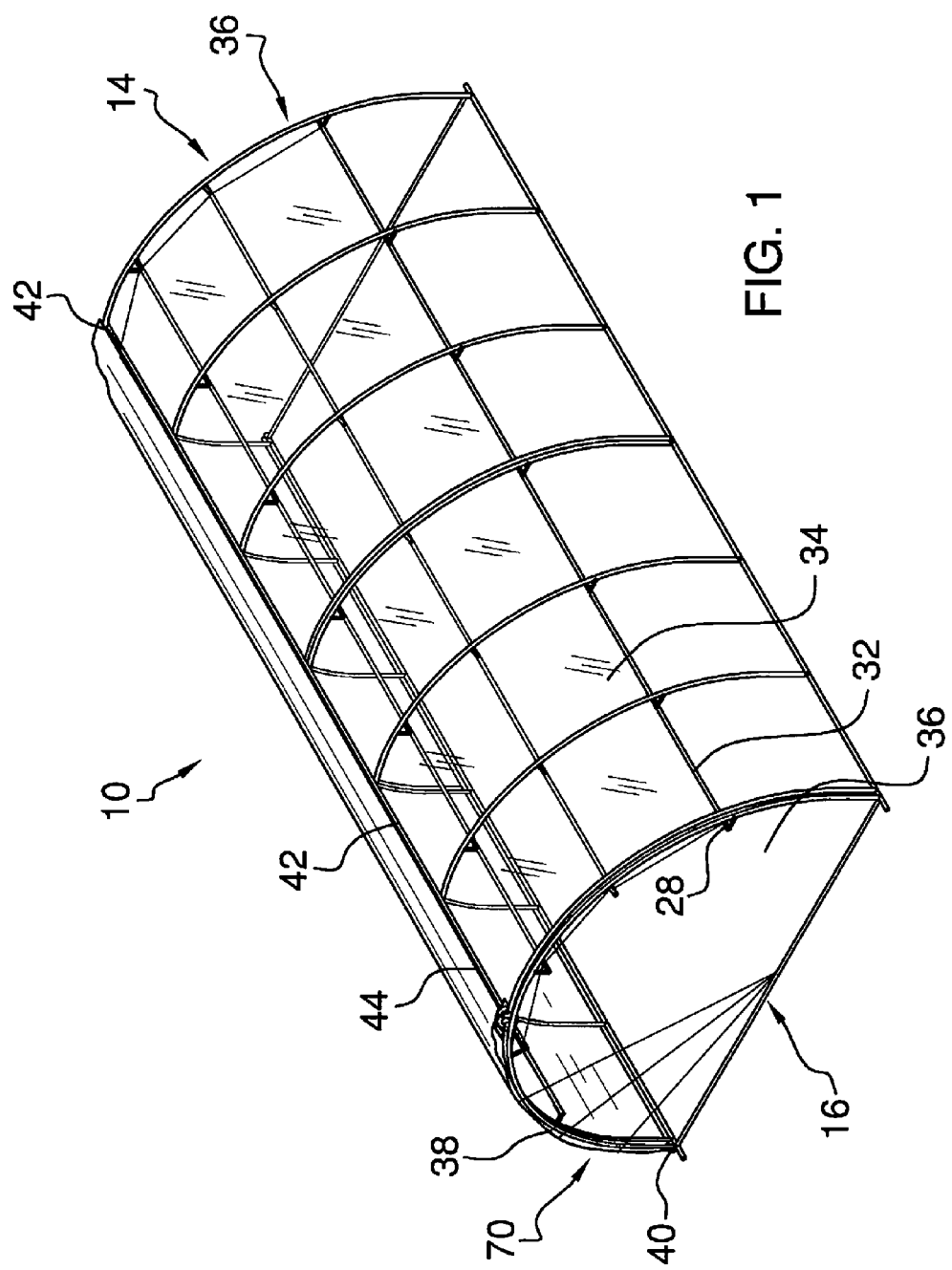
FIG. 1 is a top front side perspective view of an adjustable shade greenhouse device according to an embodiment of the disclosure.
Figure 2:
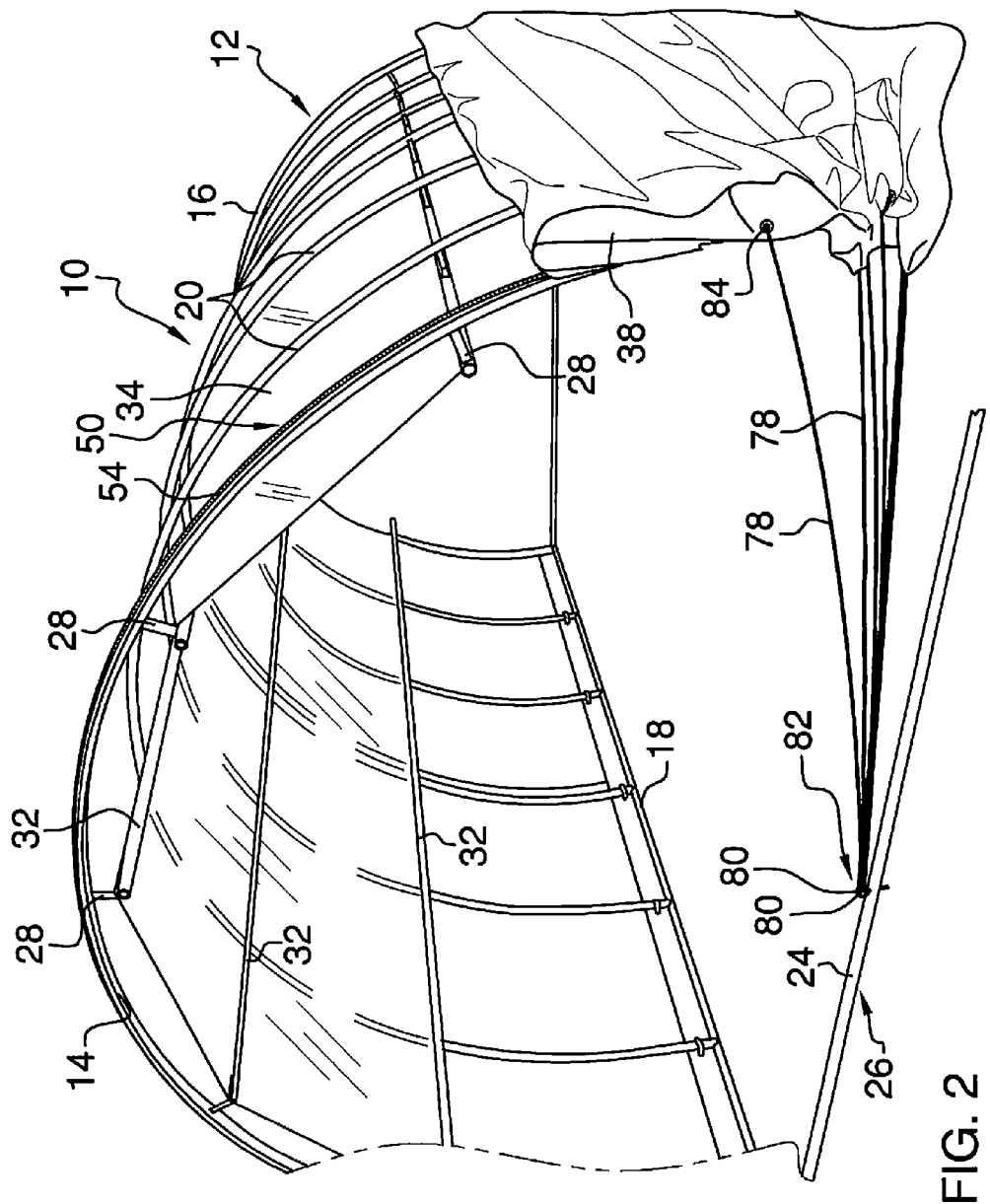
FIG. 2 is a top front side perspective view of an embodiment of the disclosure.
Figure 3:
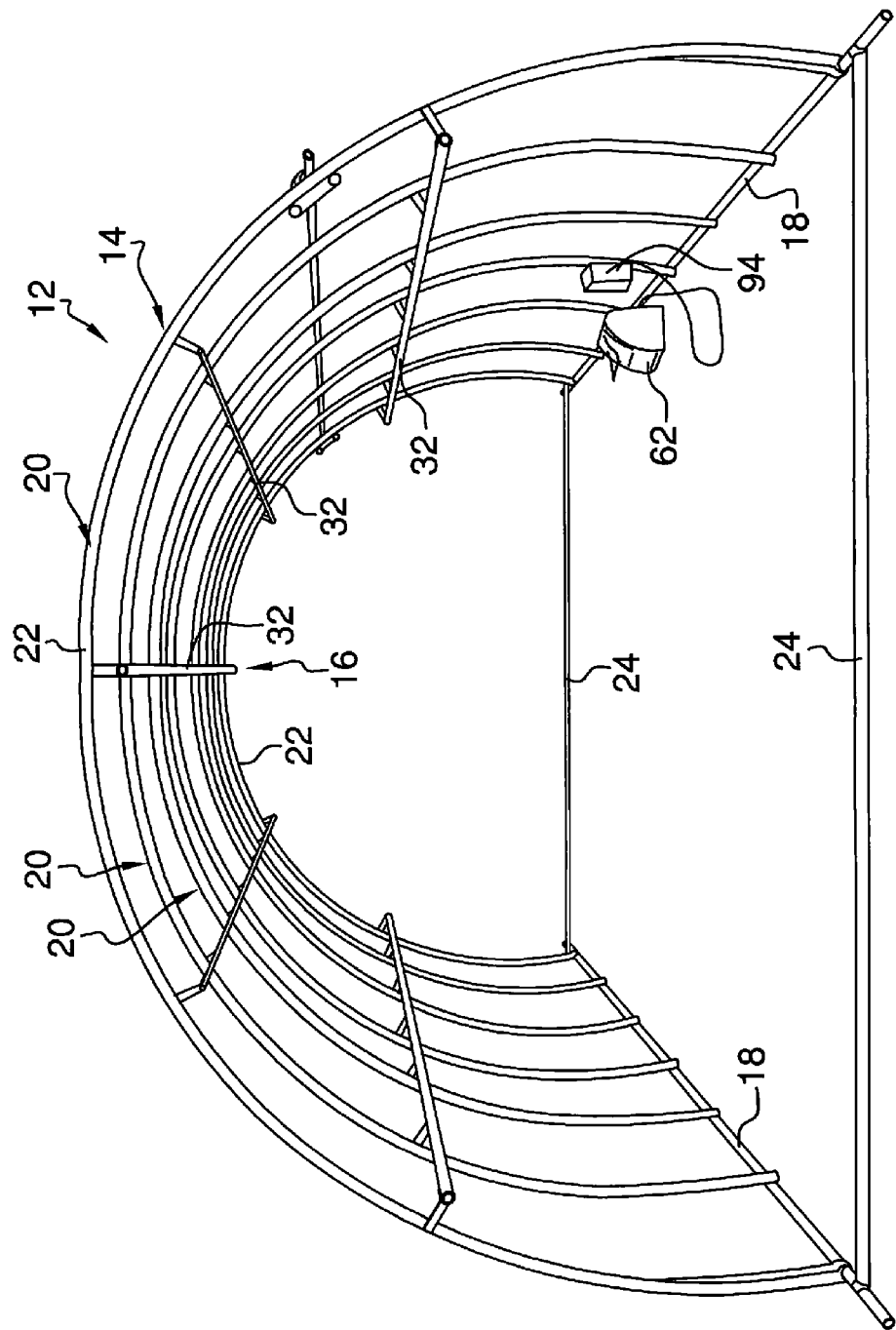
FIG. 3 is a front side perspective view of an embodiment of the disclosure.
Figure 4:
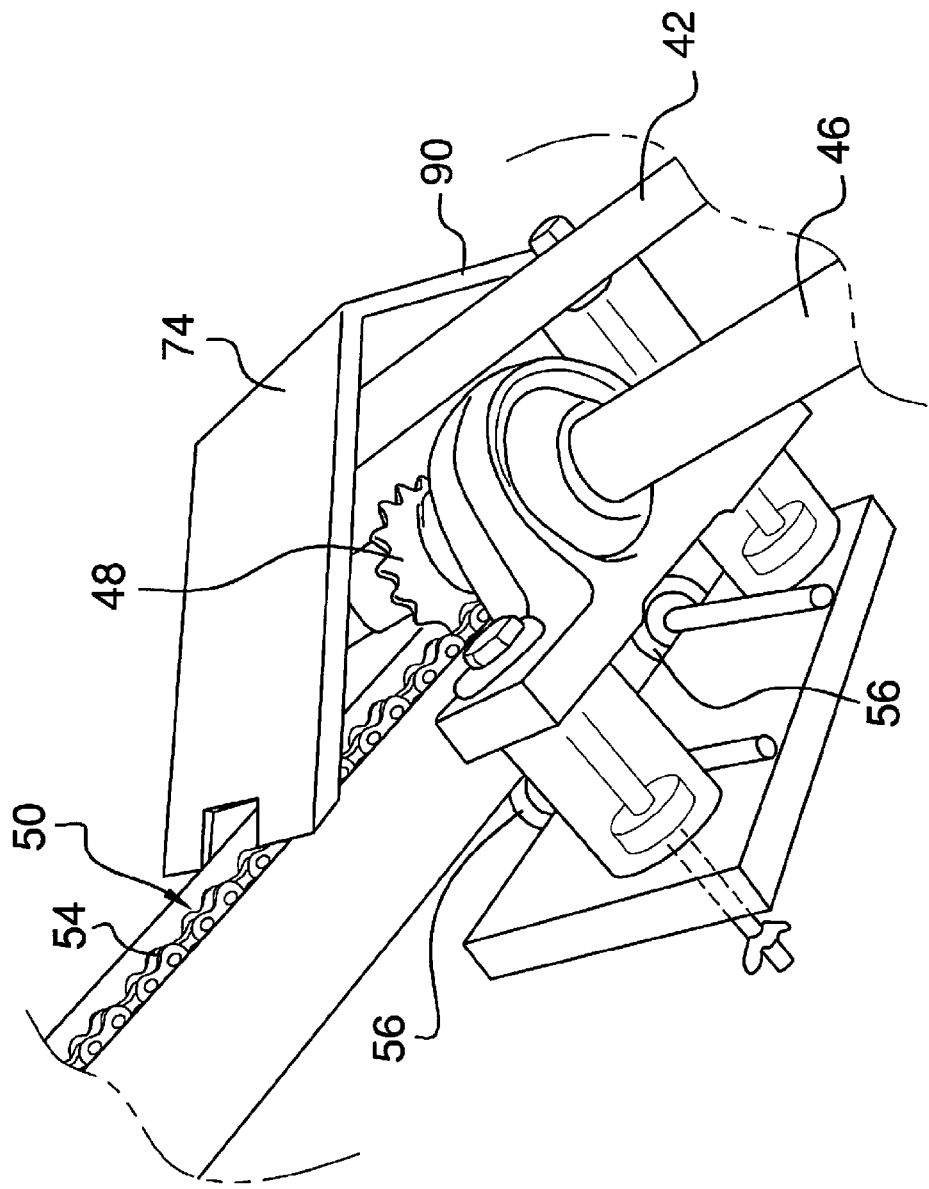
FIG. 4 is a detailed top front side perspective view of an embodiment of the disclosure.
Figure 5:
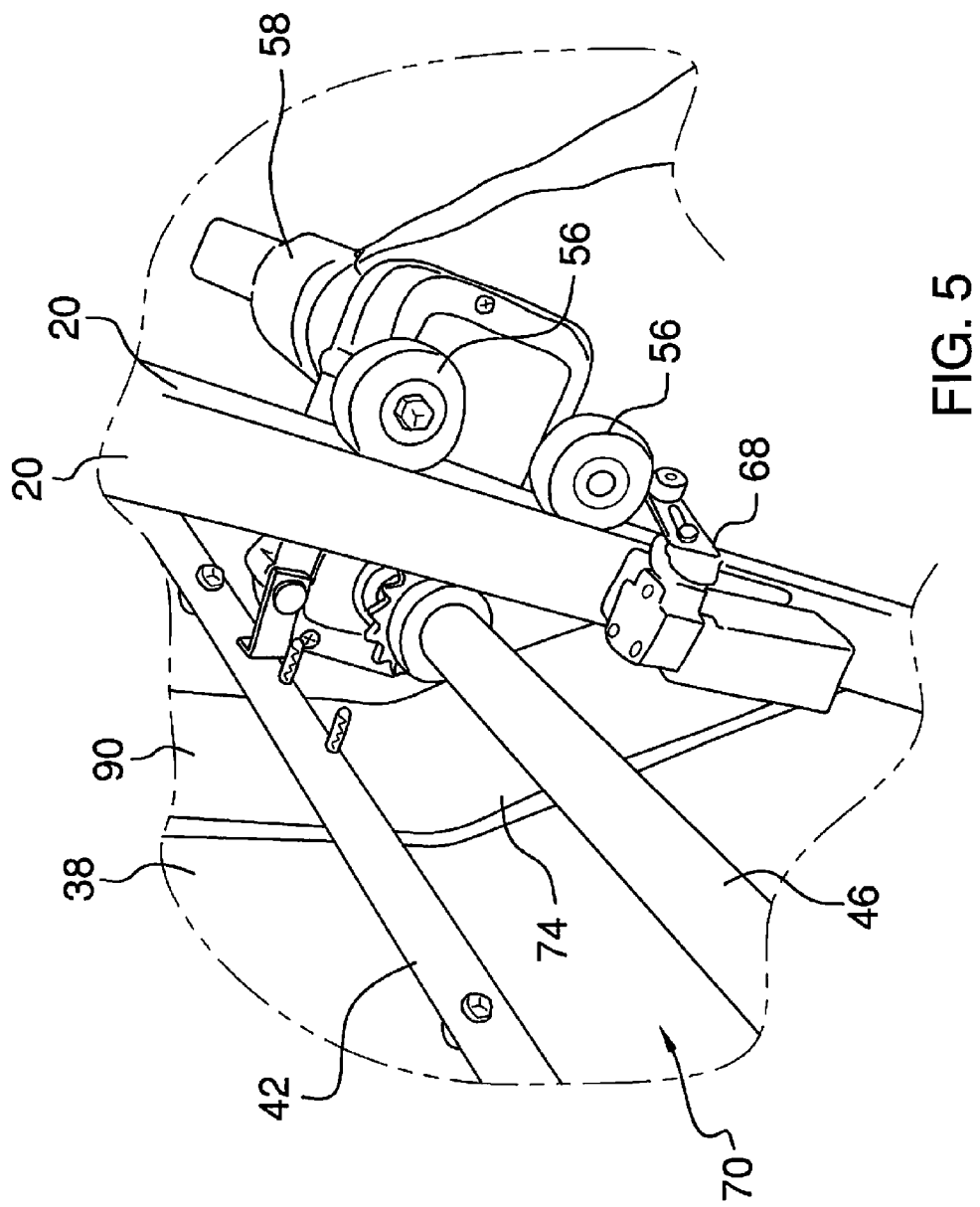
FIG. 5 is a detailed bottom front side perspective view of an embodiment of the disclosure.
Figure 6:
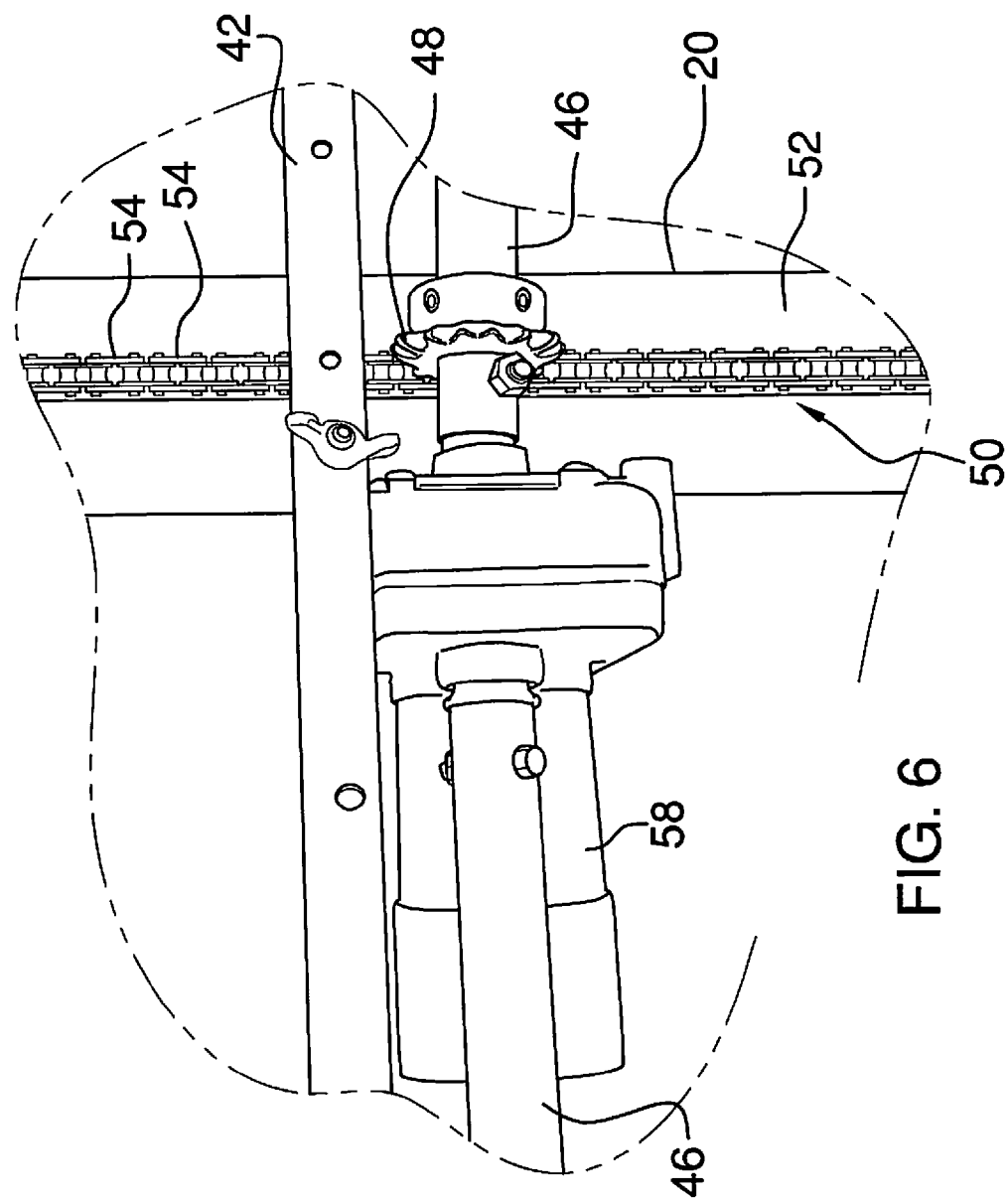
FIG. 6 is a front view of an embodiment of the disclosure.
Figure 7:
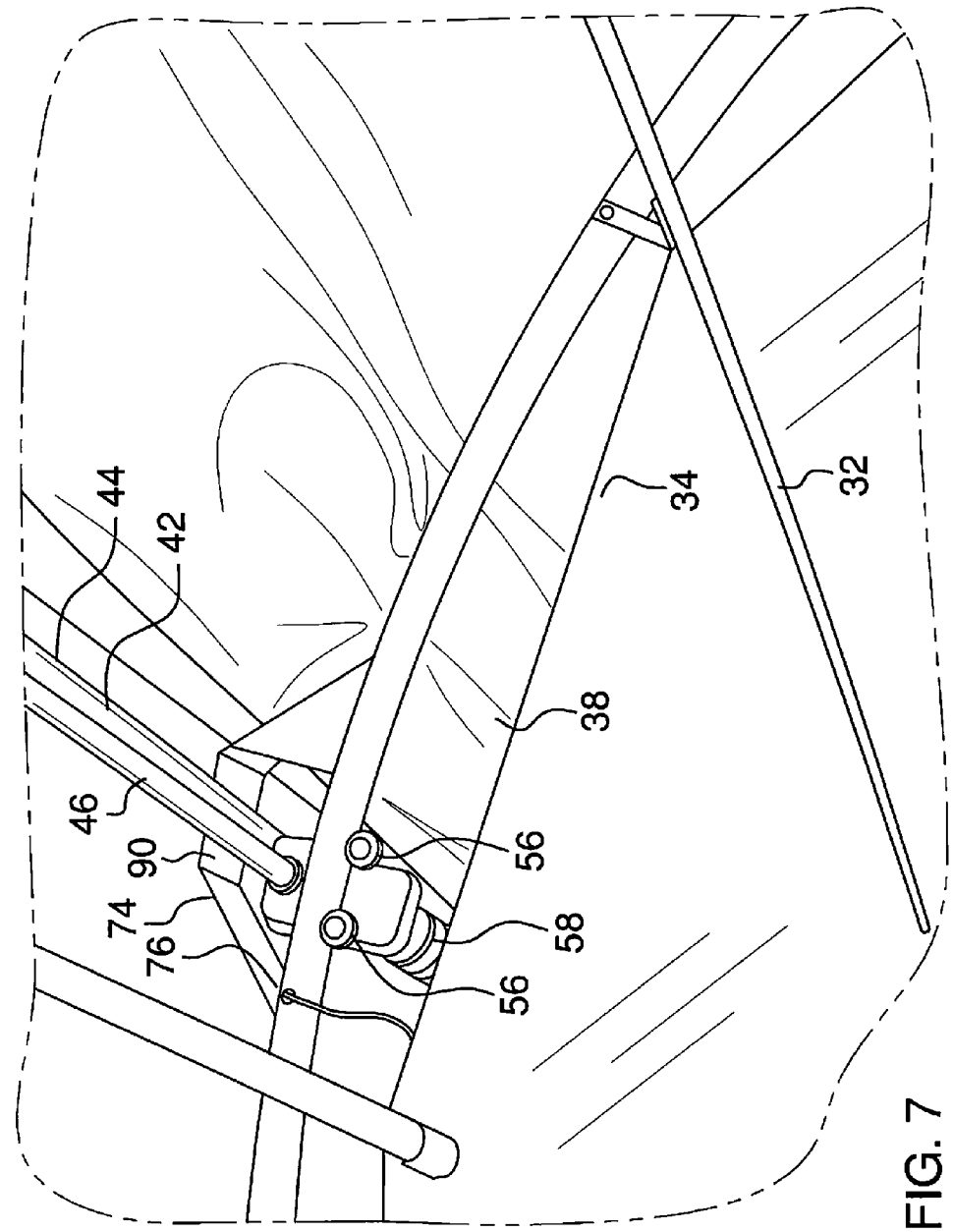
FIG. 7 is a bottom front side view of an embodiment of the disclosure.
Figure 8:
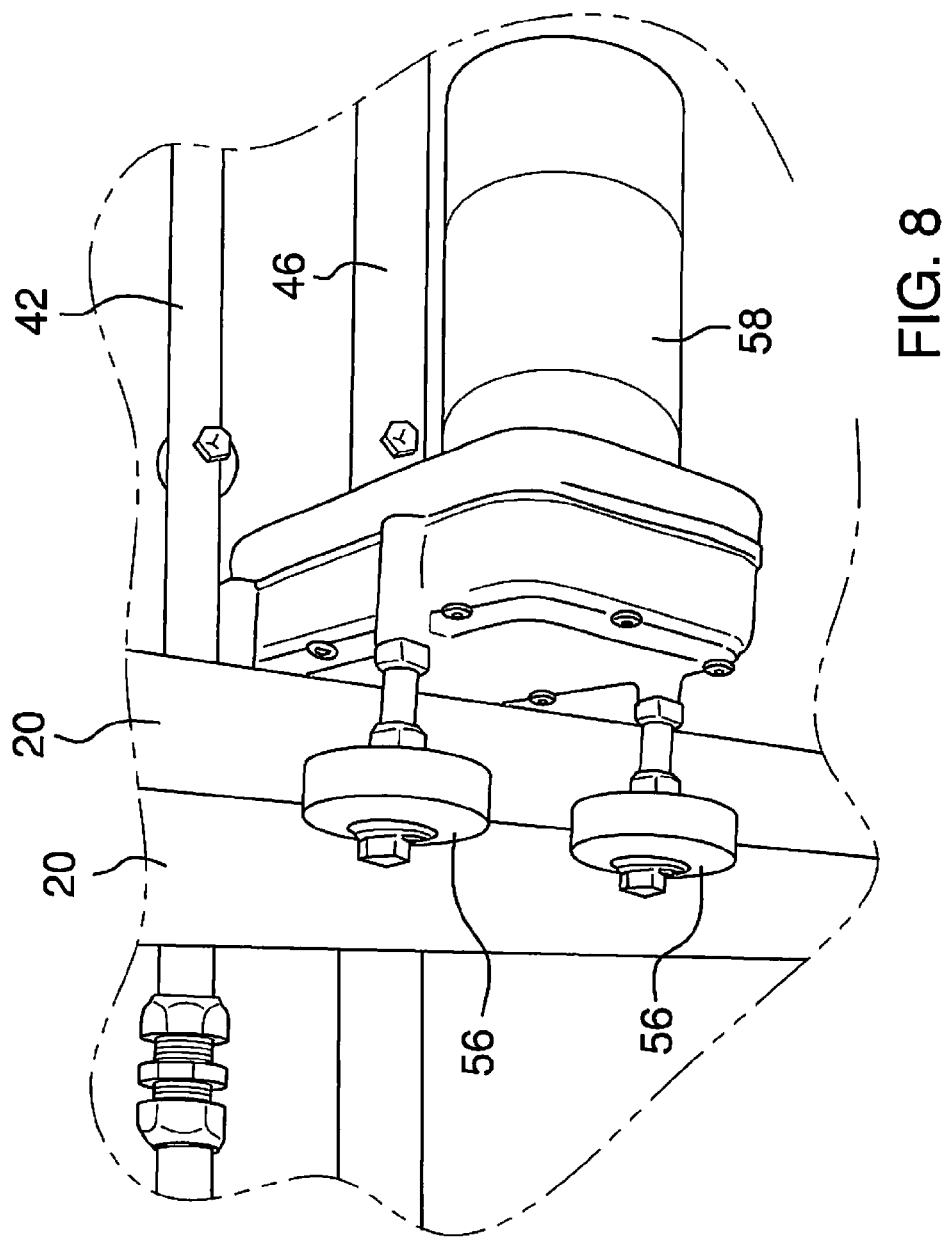
FIG. 8 is an interior view of an embodiment of the disclosure.
Figure 9:
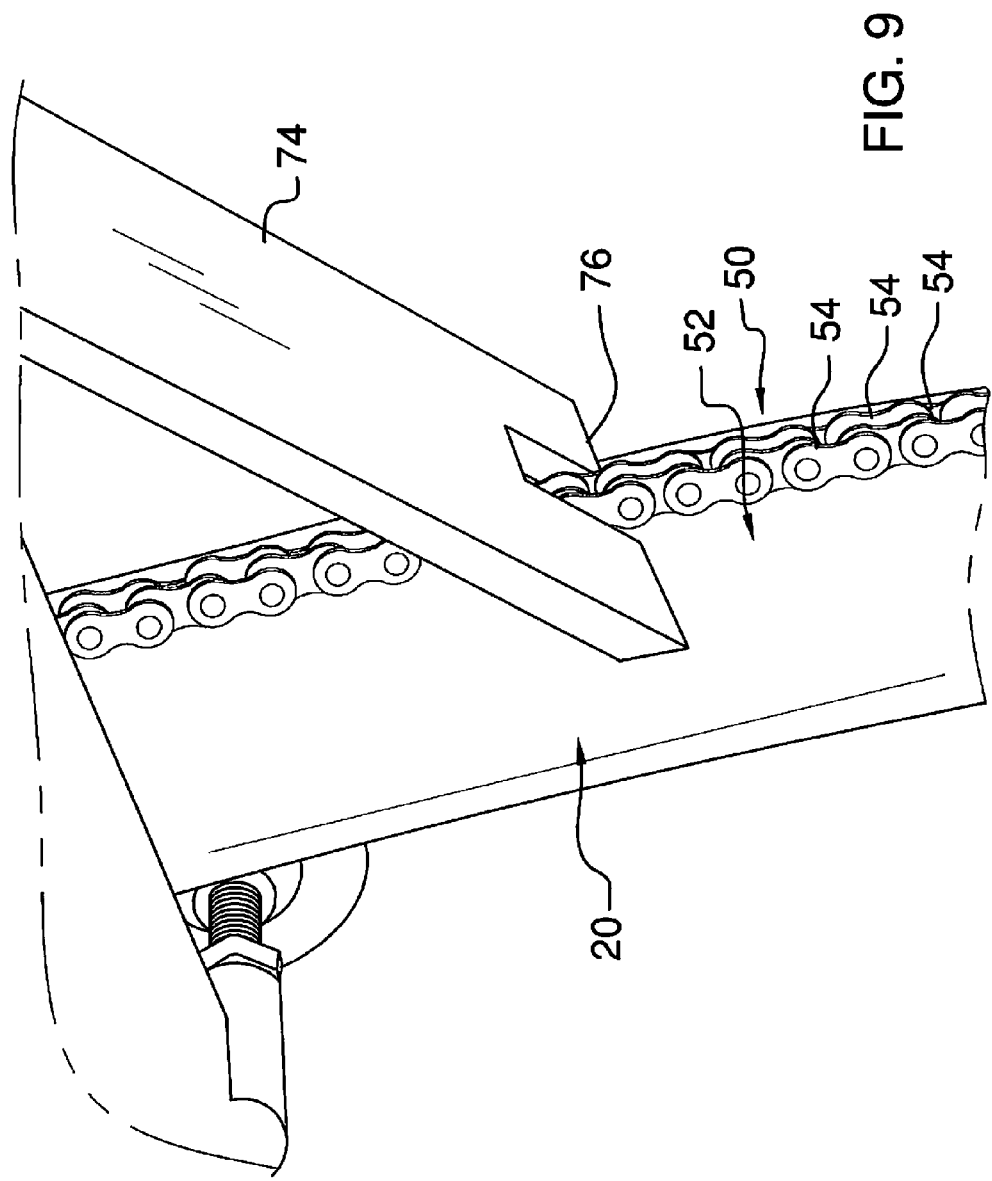
FIG. 9 is a detailed front exterior view of an embodiment of the disclosure.
Figure 10:
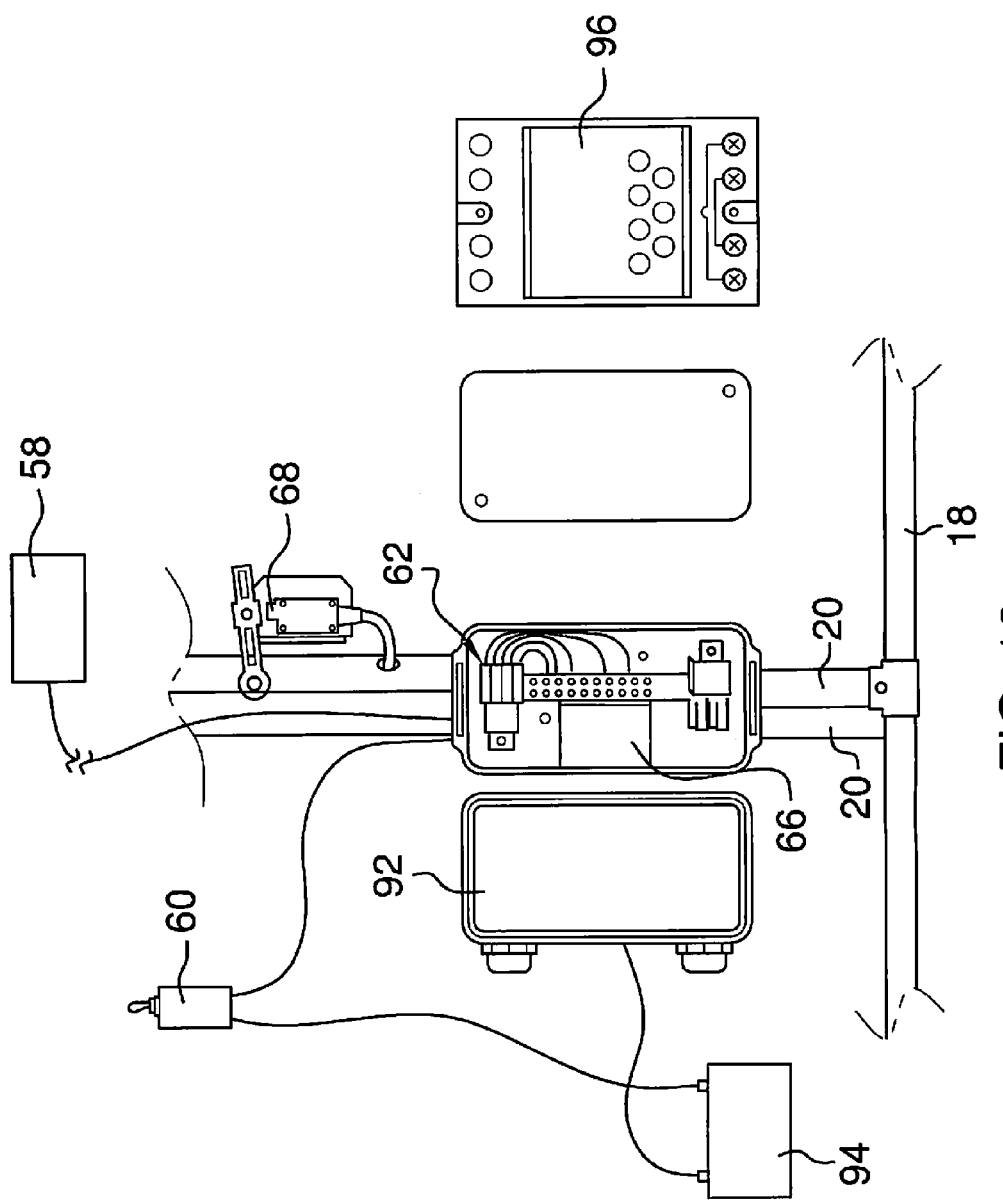
FIG. 10 is a partially schematic interior view of an embodiment of the disclosure.

With reference now to the drawings, and in particular to FIGS. 1 through 10 thereof, a new greenhouse device embodying the principles and concepts of an embodiment of the disclosure and generally designated by the reference numeral 10 will be described.

As best illustrated in FIGS. 1 through 10, the adjustable shade greenhouse device 10 generally comprises a frame 12 having a first end 14, a second end 16, a pair of spaced lateral sides 18 extending between the first end 14 and the second end 16, and a plurality of spaced cross members 20. Each cross member 20 arches between the lateral sides 18 of the frame 12. The cross members 20 may be evenly spaced between the first end 14 of the frame 12 and the second end 16 of the frame 12 or may be staggered, grouped, or otherwise arranged to provide cross members 20 positioned at desired locations along the frame 12. The spaced cross members 20 include a pair of outermost cross members 22. Each outermost cross member 22 is positioned at an associated one of the first end 14 of the frame 12 and the second end 16 of the frame 12. The frame 12 may also comprise a pair of end members 24 extending between the lateral sides 18 of the frame 12 at a bottom 26 of the frame 12. Each of a plurality of spacers 28 has a first end 30 coupled to an associated one of the outermost cross members 22. Each of a plurality of spaced longitudinal supports 32 is coupled to the frame 12 and extends between an associated pair of the spacers 28 such that each longitudinal support 32 extends continuously from the first end 14 of the frame 12 to the second end 16 of the frame 12 in inwardly spaced relationship to the cross members 20. An interior cover 34 extends across and is supported by the longitudinal supports 32 defining a main chamber of a greenhouse. End covers 36 may be positioned and coupled to the first end 14 of the frame 12 and the second end 16 of the frame 12 to enclose the main chamber of the greenhouse.

A shade 38 has a lower edge 40 coupled to one of the lateral sides 18 of the frame 12. The shade 38 may extend a full length between the first end 14 of the frame 12 and the second end 16 of the frame 12. A transport bar 42 is coupled to the frame 12 transverse to the cross members 20. The transport bar 42 is selectively movable along the cross members 20 between the lateral sides 18 of the frame 12. A top end 44 of the shade 38 is coupled to the transport bar 42 wherein the shade 38 is selectively extendable and retractable over the frame 12 by movement of the transport bar 42 over the frame 12. The transport bar 42 may extend a full length from the first end 14 of the frame 12 to the second end 16 of the frame 12.

An axle 46 extends between the first end 14 of the frame 12 and the second end 16 of the frame 12 and may also extend the full length between the first end 14 of the frame 12 and the second end 16 of the frame 12. The axle 46 is coupled to the transport bar 42 and positioned in parallel spaced relationship to the transport bar 42. Each of a plurality of gears 48 is coupled the axle 46 wherein each gear 48 rotates with rotation of the axle 46. Each of a plurality of tracks 50 is coupled to and extends along an associated one of the cross members 20. Each gear 48 engages an associated one of the tracks 50 wherein rotation of each gear 48 moves the transport bar 42 along the associated cross member 20. Each track 50 may be positioned on an exterior side 52 of the associated cross member 20. Each track 50 may be comprised of bike chain type links 54 affixed to the associated cross member 20. Each of a plurality of rollers 56 is coupled to the axle 46 and the transport bar 42. Each roller 56 may be coupled to an undercarriage plate 102 in a fixed manner such as by welding or the like. The axle 46 is rotationally coupled to a bearing 106 within a bearing collar 110. Tubes 108 may be used to secure the bearing 106 and transport bar 42 together. The undercarriage plate 102 may then be attached to the tubes 108. Thus, the rollers 56 are positioned to sandwich the track 50 between the rollers 56 and the gear 48. Each roller 56 abuts an associated one of the cross members 20 opposite an associated one of the gears 48 wherein the roller 56 holds the associated gear 48 in engagement with the associated track 50.

A motor 58 is coupled to the axle 46. The motor 58 selectively rotates the axle 46 wherein the transport bar 42 is moved along the cross members 20 by the gears 48 moving along the associated tracks 50. The motor 58 is reversible wherein the motor 58 selectively drives the shade 38 to extend and retract as desired. The motor 58 may be controlled in a variety of ways including a manual switch 60 hardwired to a control panel 62 in operational communication with the motor 58 or incorporated into a remote control 66 operationally coupled to the motor 58 wirelessly or hardwired through the control panel 62 The motor 58 may be selectively actuated by manipulation of the manual switch 60. Alternatively, or in combination with the manual switch 60, a timer 96 may be communicatively or electrically coupled to the motor 58. For this purpose, the control panel 62 may include controls 98 to be manipulated for programming and controlling the motor 58. The timer 96 is programmable such that the motor 58 is selectively activated according to a programmed schedule to extend and retract the shade 38 by desired amounts producing shade or sun exposure for the greenhouse as desired. A limit switch 68 may be positioned on the frame 12. The limit switch 68 is engaged by movement of the transport bar 42 to a fully extended position 70. The limit switch 68 is communicatively coupled to the motor 58 wherein the limit switch 68 deactivates the motor 58 upon the transport bar 42 reaching the fully extended position 70. The limit switch 68 may alternatively positioned in any desired location to limit extension of the shade 38 over the frame 12 as may be desired. A battery 94 is electrically coupled to the control panel 62 and the motor 58. A control box lid 92 may be pivotally coupled to a housing 104 holding the control panel 62. The timer 96 may be communicatively coupled to the control panel 62 to automatically run the motor 58 according to a programmable schedule. The operations of the motor 58, timer 96, controls 98 and the like may be coordinated through a central processing unit 112 coupled to the control panel 62.

Each of a plurality of guards 74 may be aligned with and extend over an associated one of the gears 46 wherein each guard 74 prevents the shade 38 from contacting the associated gear 46. A flat medial section 90 of each guard may pass between the transport bar 42 and the shade 38. Each guard 74 may have slotted ends 76. The track 50 engaged by the associated gear 46 extends through the slotted ends 76 of each guard 74 facilitating proper alignment and movement of the transport bar 42 and axle 46 along the tracks 50. Each guard 74 may further assist in removing or minimizing debris from the track 50 prior to the associated gear 46 passing over a section of the track 50.

Each of a plurality of lines 78 has a base end 80 coupled to a medial point 82 of an associated one of the end members 24. Each line 78 has an outer end 84 coupled to an associated end edge 86 of the shade 38. The outer ends 84 are coupled in spaced relationship along the end edge 86 wherein the lines 78 hold the shade 38 in extension between the first end 14 of the frame 12 and the second end 16 of the frame 12.

In use, the greenhouse is used in conventional fashion as it is structured similar to conventional hoop style greenhouses. The shade 38 is extended and retracted selectively and automatically by control of the motor 58 through use of the manual switch 60 or programming of the timer 66. Thusly, periods of shade and sun exposure may be precisely controlled to provide the desired environment within the greenhouse.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable shade greenhouse device comprising:

a frame having a first end, a second end, a pair of spaced lateral sides extending between said first end and said second end, and a plurality of spaced cross members, each cross member arching between said lateral sides of said frame, said spaced cross members comprising a pair of outermost cross members, each outermost cross member being positioned at an associated one of said first end of said frame and said second end of said frame;

a plurality of spacers, each spacer having a first end coupled to an associated one of said outermost cross members;

a plurality of spaced longitudinal supports, each longitudinal support being coupled to and extending between an associated pair of said spacers such that each longitudinal support extends from said first end of said frame to said second end of said frame in inwardly spaced relationship to said cross members;

an interior cover extending across and being supported by said longitudinal supports;

a shade having a lower edge coupled to one of said lateral sides of said frame;

a transport bar coupled to said frame transverse to said cross members, said transport bar being selectively movable along said cross members between said lateral sides of said frame, a top end of said shade coupled to said transport bar wherein said shade is selectively extendable and retractable over said frame by movement of said transport bar;

an axle extending from said first end of said frame to said second end of said frame, said axle being coupled to said transport bar, said axle being positioned parallel to said transport bar;

a plurality of gears, each gear being coupled said axle a plurality of tracks, each track being coupled to and extending along an associated one of said cross members, each gear engaging an associated one of said tracks wherein rotation of each said gear moves said transport bar along said associated cross member; and a plurality of rollers, each roller being coupled to said axle and said transport bar, each said roller abutting an associated one of said cross members opposite an associated one of said gears wherein said roller holds said associated gear in engagement with said associated track.

2. The device of claim 1, further comprising said transport bar extending from said first end of said frame to said second end of said frame.

3. The device of claim 1, further comprising a motor coupled to said axle, said motor selectively rotating said axle wherein said transport bar is moved along said cross members by said gears moving along said tracks.

4. The device of claim 3, further comprising a manual switch operationally coupled to said motor wherein said motor is selectively actuated by manipulation of said switch.

5. The device of claim 3, further comprising a limit switch positioned on said frame, said limit switch being engaged by movement of said transport bar to a fully extended position, said limit switch being communicatively coupled to said motor wherein said limit switch deactivates said motor upon said transport bar reaching said fully extended position.

6. The device of claim 1, further comprising each said track being positioned on an exterior side of said associated cross member.

7. The device of claim 1, further comprising a plurality of guards, each said guard being aligned with and extending over an associated one of said gears wherein each said guard prevents said shade from contacting said associated gear.

8. The device of claim 7, further comprising each said guard having slotted ends, said track engaged by said associated gear extending through said slotted ends of each said guard.

9. The device of claim 3, further comprising a timer coupled to said motor, said timer being programmable wherein said motor is selectively activated according to a programmed schedule.

10. The device of claim 3, further comprising said motor being reversible wherein said motor selectively drives said shade to extend and retract.

11. The device of claim 1, further comprising:
said frame comprising a pair of end members, each end member extending between said lateral sides of said frame; and
a plurality of lines, each said line having a base end coupled to a medial point of an associated one of said end members, each said line having an outer end coupled to an associated end edge of said shade wherein said lines hold said shade in extension between said first end of said frame and said second end of said frame.

12. The device of claim 1, further comprising said shade extending a full length between said first end of said frame and said second end of said frame.

13. An adjustable shade greenhouse device comprising:
a frame having a first end, a second end, a pair of spaced lateral sides extending between said first end and said second end, and a plurality of spaced cross members, each cross member arching between said lateral sides of said frame, said spaced cross members comprising a pair of outermost cross members, each outermost cross member being positioned at an associated one of said first end of said frame and said second end of said frame, said frame comprising a pair of end members, each end member extending between said lateral sides of said frame;

a plurality of spacers, each spacer having a first end coupled to an associated one of said outermost cross members;

a plurality of spaced longitudinal supports, each longitudinal support being coupled to and extending between an associated pair of said spacers such that each longitudinal support extends from said first end of said frame to said second end of said frame in inwardly spaced relationship to said cross members;

an interior cover extending across and being supported by said longitudinal supports;

a shade having a lower edge coupled to one of said lateral sides of said frame, said shade extending a full length between said first end of said frame and said second end of said frame;

a transport bar coupled to said frame transverse to said cross members, said transport bar being selectively movable along said cross members between said lateral sides of said frame, a top end of said shade coupled to said transport bar wherein said shade is selectively extendable and retractable over said frame by movement of said transport bar, said transport bar extending from said first end of said frame to said second end of said frame;

an axle extending from said first end of said frame to said second end of said frame, said axle being coupled to said transport bar, said axle being positioned parallel to said transport bar;

a plurality of gears, each gear being coupled said axle wherein each said gear rotates with rotation of said axle;

a plurality of tracks, each track being coupled to and extending along an associated one of said cross members, each gear engaging an associated one of said tracks wherein rotation of each said gear moves said transport bar along said associated cross member, each said track being positioned on an exterior side of said associated cross member;

a plurality of rollers, each roller being coupled to said axle and said transport bar, each said roller abutting an associated one of said cross members opposite an associated one of said gears wherein said roller holds said associated gear in engagement with said associated track;

a motor coupled to said axle, said motor selectively rotating said axle wherein said transport bar is moved along said cross members by said gears moving along said tracks, said motor being reversible wherein said motor selectively drives said shade to extend and retract;

a manual switch operationally coupled to said motor wherein said motor is selectively actuated by manipulation of said manual switch;

a limit switch positioned on said frame, said limit switch being engaged by movement of said transport bar to a fully extended position, said limit switch being communicatively coupled to said motor wherein said limit switch deactivates said motor upon said transport bar reaching said fully extended position;

a plurality of guards, each said guard being aligned with and extending over an associated one of said gears wherein each said guard prevents said shade from contacting said associated gear, each said guard having slotted ends, said track engaged by said associated gear extending through said slotted ends of each said guard;

a timer coupled to said motor, said timer being programmable wherein said motor is selectively activated according to a programmed schedule; and a plurality of lines, each said line having a base end coupled to a medial point of an associated one of said end members, each said line having an outer end coupled to an associated end edge of said shade wherein said lines hold said shade in extension between said first end of said frame and said second end of said frame.

* * * * *